Aug. 14, 1962   H. J. WEILAND   3,048,887
METHOD AND APPARATUS FOR PRILLING FERTILIZER COMPOSITIONS
Filed Dec. 31, 1959   2 Sheets-Sheet 1

HENRY J. WEILAND
INVENTOR.

BY Ernest G. Peterson
AGENT

Aug. 14, 1962    H. J. WEILAND    3,048,887
METHOD AND APPARATUS FOR PRILLING FERTILIZER COMPOSITIONS
Filed Dec. 31, 1959    2 Sheets-Sheet 2

HENRY J. WEILAND
INVENTOR.

BY Ernest G. Peterson
AGENT

United States Patent Office 3,048,887
Patented Aug. 14, 1962

3,048,887
METHOD AND APPARATUS FOR PRILLING
FERTILIZER COMPOSITIONS
Henry J. Weiland, Birmingham, Ala., assignor to Hercules Powder Company, Wilmington, Del., a corporation of Delaware
Filed Dec. 31, 1959, Ser. No. 863,274
16 Claims. (Cl. 18—2.7)

This invention relates to an improved method and apparatus for granulating chemical substances. More particularly, it relates to the production of prilled or granulated fertilizer compositions.

The prilling of plant nutrients such as ammonium nitrate and urea in prilling or spray towers is well known. However, various problems have been encountered in the operation of such towers. For example, the dispersion orifices in the prill or granulation plate at the top of the tower tend to freeze and clog. This condition is particularly aggravated in the production of mixed fertilizers where it is desired to incorporate additional plant nutrient which is lacking in solubility or fusibility and, therefore, must be incorporated in the form of finely divided solid material. Moreover, there is a tendency for the fertilizer material to adhere to the sidewall of the head tank which feeds the prill plate in the region immediately above the plate and thus cause a build-up of material. This condition is undesirable as undue residence of the material causes nonuniformity and degradation and as the material continues to build up or is broken free, the dispersion orifices become clogged which eventually requires the prilling tower to be shut down for cleaning of the prill plate. Many innovations have been tried to alleviate this condition as is well known in the art. Nevertheless, these innovations have not provided a simple, economical solution to the problem and especially from the viewpoint of assuring substantially continuous operation in instances where prill plate difficulty is eventually encountered.

Therefore, a primary object of the present invention is to provide a method and apparatus for prilling fertilizer compositions which assure long uninterrupted prilling cycles and assure substantially continuous operation even in instances where the prilling cycle is eventually interrupted due to prill plate or other distribution difficulty.

Other objects of the invention will appear hereinafter, the novel features and combinations being set forth in the appended claims.

Generally described, in a method of granulating chemical substances from molten material thereof by passing the molten material through dispersion orifices from which it emerges in droplet form and is then passed into a solidification zone to form discrete solid granules, the present invention is directed to an improvement which comprises subjecting the molten material to vertical vibratory impulses with lateral displacement at the periphery thereof in the zone immediately above the dispersion orifices. Additional aspects of the improvement include agitation of the molten material with downward displacement thereof and control of hydrostatic head of the molten material to obtain optimum dispersion conditions.

A preferred embodiment of the invention including apparatus for carrying the invention into effect has been chosen for purposes of illustration and description and is shown in the accompanying drawing forming a part of the specification wherein reference symbols refer to like parts wherever they occur.

Figure 1:
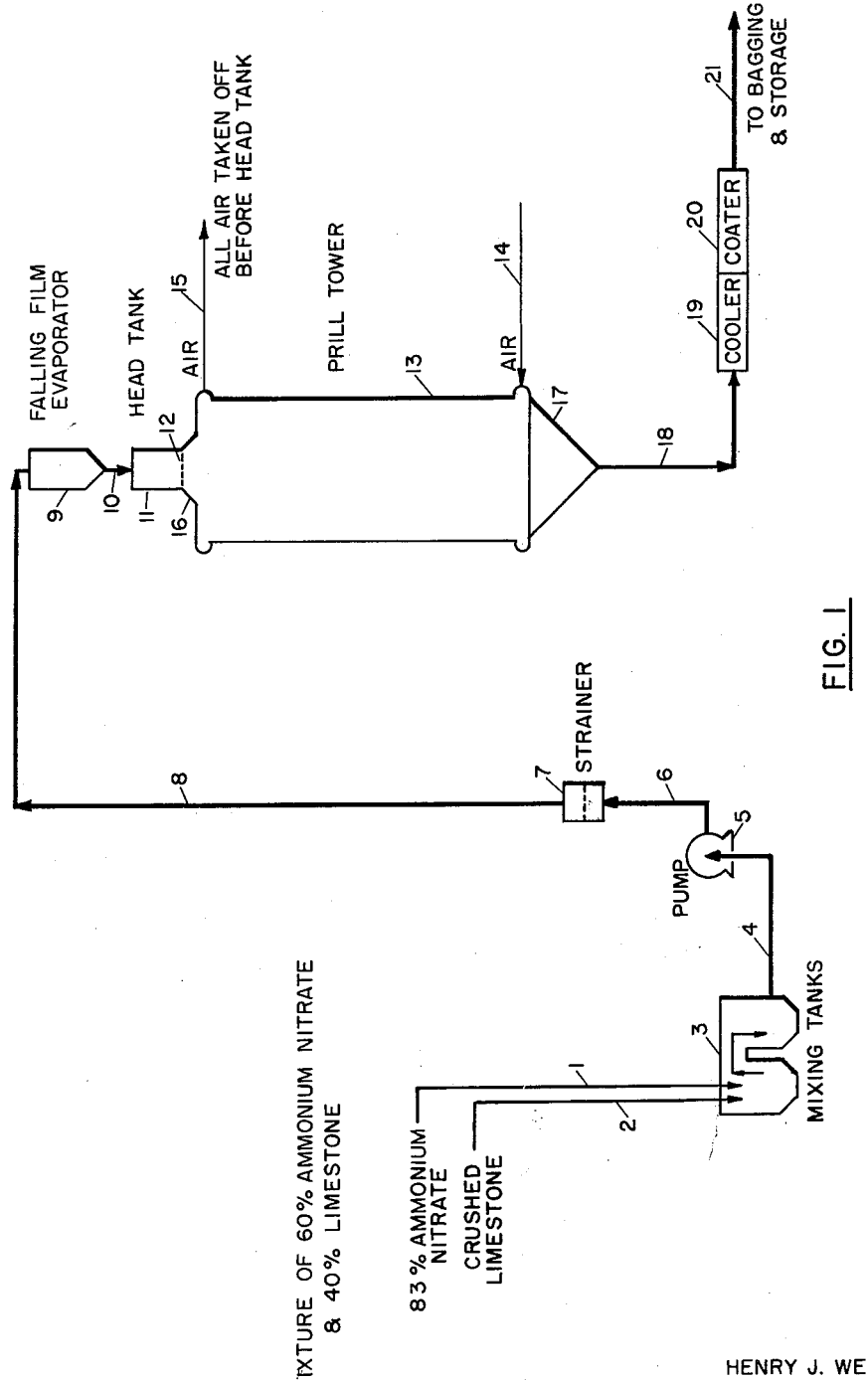
FIG. 1 is a flow diagram showing one series of operations which may be advantageously carried out in practicing the invention.

Referring now particularly to FIG. 1, an aqueous solution of 83% ammonium nitrate and finely powdered dolomitic limestone are continuously fed through conduits 1 and 2, respectively, into mixing tanks 3 in proportion to a given mixture of 60% ammonium nitrate and 40% limestone by weight. The mixing tanks 3 are provided with suitable agitators and suitable heating means (not shown) to insure a uniform and intimate mixing of the ingredients. The temperature of mixing is not critical except insofar as the mixture should be maintained at a temperature above the melting point of the ammonium nitrate of specified strength being utilized but below about 250° F. since higher temperatures favor a reaction of the mixture. In the case of the aqueous solution of 83% ammonium nitrate as used herein, a temperature range of from about 200° F. to about 250° F. when using unheated finely divided dolomitic limestone having a particle size of substantially 100% through a 72-mesh sieve was found to give optimum results.

The suspension or slurry mixture from the mixing tanks 3 is passed through conduit 4 to a pump 5 from which the slurry is pumped through a conduit 6 to a strainer 7. The strainer 7 is utilized to remove any nonuniform lumps from the slurry as it passes therethrough. From the strainer 7 the slurry passes through a conduit 8 and into the top of a falling film evaporator 9. As designated, the evaporator 9 is of the falling film type such as disclosed in U.S. Patent 2,089,945 to J. D. Converse et al. The process involves causing a solution containing a compound and a volatile fluid to flow in the form of a continuously moving film over a heated surface countercurrent to a stream of heated inert gas while maintaining said surface at a temperature above the melting point of the compound in the anhydrous state and maintaining the rate of flow sufficiently rapid and the contact of the film with the heated surface sufficiently short to avoid decomposition of the compound, but sufficiently long to substantially dehydrate said compound. In the instant application of the falling film evaporator, it will be appreciated that the aqueous slurry mixture enters the top of the evaporator and as it descends in the form of a thin film, the aqueous content is progressively removed therefrom until at the bottom of the evaporator there is obtained a molten mixture or slurry substantially free from water. In accordance with the preferred embodiment of this invention, approximately 7,500 pounds per hour of the aqueous slurry mixture was fed to the evaporator 9 and the evaporator was heated with steam at a pressure of from 180 to 200 pounds per square inch while at the same time air preheated by steam at the same pressure was blown through the evaporator countercurrent to the descending slurry. This corresponded to a heated surface temperature of from about 375° to about 380° F. and a heated inert gas temperature of from about 340° to about 365° F. which rendered the dehydrated mixture a molten slurry at the bottom of the evaporator.

The molten slurry from the bottom of the evaporator 9 was passed through a conduit 10 into a head tank 11. The head tank 11 was provided with suitable agitation and suitable heating means to provide for passage of the molten slurry in the form of droplets through a prill plate 12 located at the bottom of the head tank. The head tank 11 was positioned concentrically on the top of a prill tower 13 which was provided with an air inlet 14 near the bottom thereof and an air outlet 15 near the top thereof for passing cooling air countercurrently to the descending droplets of the molten slurry. The prill tower 13 at the top thereof had a truncated conical section 16 which adjoined the bottom of the head tank 11. All air from the prill tower 13 was taken off before the head tank 11 so that the area immediately beneath the prill plate 12 formed a relatively uncooled quiescent zone for effective formation of the prill droplets.

The bottom of the prill tower 13 was formed into a conical section 17 for collection of the solidified prills at the base of the tower. The prills from the base of the tower were fed through a conduit 18 to a cooler 19 wherein they were further cooled before passing into a coater 20 for application of suitable coating agent. From the coater 20, the coated prills were fed through a conduit 21 to suitable bagging and storage facilities.

Figure 4:
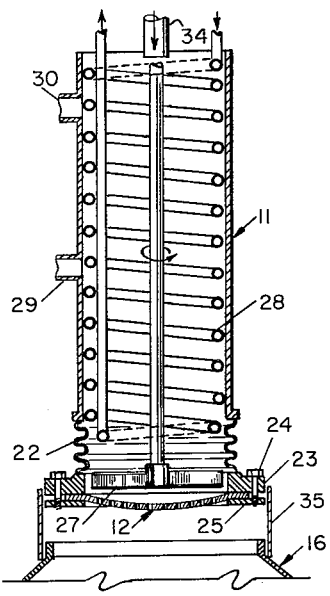
FIG. 4 is a vertical sectional view of the head tank shown in FIG. 3.
Figure 3:
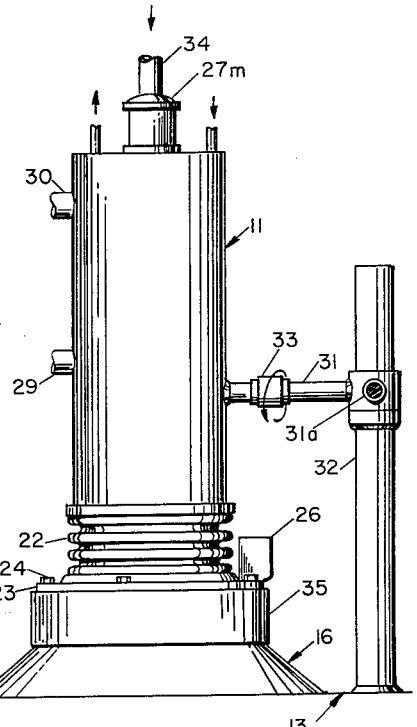
FIG. 3 is a fragmentary, elevational view taken along line 3—3 of FIG. 2.
Figure 2:
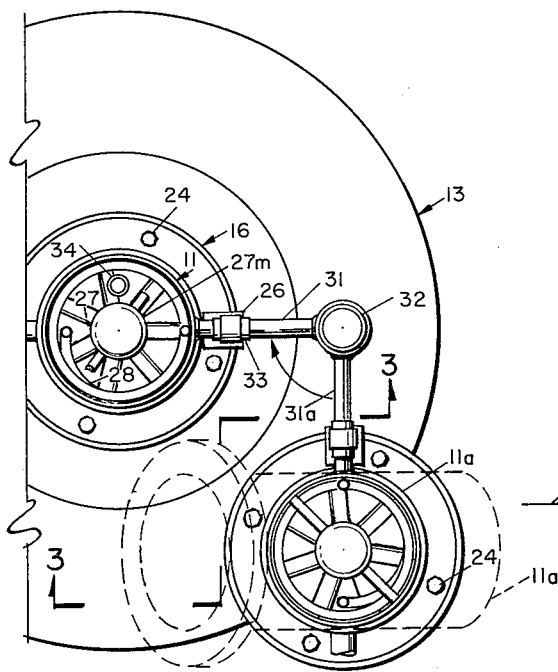
FIG. 2 is a fragmentary, plan view of the top of a granulation tower with head tanks illustrating application of the invention.

Referring now particularly to FIG. 2, FIG. 3 and FIG. 4 depicting the head tank assembly, the head tank 11 was approximately 12 inches in diameter and approximately 42 inches high as measured from the prill plate to the top of the tank. The lower body portion of the head tank 11 was provided with a 0.015-inch thick vertically resilient section 22 approximately 4 inches high having its upper end welded to the head tank and its lower end welded to a flange 23. The flange 23 through a plurality of bolts 24 had a retainer ring 25 rigidly secured therewith. Interposed between the flange 23 and the retainer ring 25 was the prill or orifice plate 12. The orifice plate 12 was of the convexo-concave type and in accordance with the preferred embodiment of the invention set forth herein, the plate was provided with 800 holes substantially uniformly spaced, each having a diameter of 0.025 inch. A vibrator 26 was affixed to the upper side of the flange 23 and was adapted to impart vertical impulses to the orifice plate 12 and the vertically resilient section 22 which was fabricated in a bellows-like form. The vibrator utilized was an air driven, low impact, high frequency device operated at a frequency of about 18,000 cycles per second. A rotatably driven agitator 27 was disposed in the lower body portion of the head tank 11 in juxtaposition to the orifice plate 12. A motor 27m suitably affixed to the top of the head tank was utilized to drive the agitator. The agitator was of the propeller type having blades disposed to give a downward thrust to the material being agitated. The agitator utilized was 10 inches in diameter and was equipped with seven blades pitched at an angle of 45° to the vertical axis of the drive shaft. A helically wound steam coil 28 provided with suitable inlet and outlet means was disposed within the head tank 11 along the inner wall thereof and extended substantially throughout its height. A liquid level outlet 29 and a liquid level outlet 30 were provided in the side of the head tank 11 to provide means for maintaining a predetermined hydrostatic head of liquid within the tank as well as providing means for accelerating emptying of the tank when the orifice plate pass-through falls below an efficient level. The liquid level outlet 29 was positioned about 18 inches above the orifice plate 12 and the outlet 30 was positioned about 36 inches above the orifice plate. The assembly heretofore immediately described, where subjected to corrosive elements, was made of stainless steel, and the entire assembly was supported by a horizontal arm 31 which in turn was journaled to a vertical support 32 which was affixed to the top of the tower 13. The horizontal arm 31 was provided with a coupling member 33 adapted to permit rotation of the head tank 11 for cleaning purposes or facile change of the orifice plate 12. This will be more readily understood by reference to FIG. 2 and FIG. 3 where it will be seen that an alternate head tank 11a supported by a horizontal arm 31a is positioned at a right angle to the head tank 11. The head tank 11a is provided with all the appurtenances of head tank 11 and, thus, its arrangement will not be repeated in descriptive detail. However, when the head tank being utilized falls below a certain efficiency in respect to pass-through of material, the other head tank is immediately swung into position and made operative. The low efficiency head tank is then cleaned in rotative position as demonstrated by FIG. 2 for the servicing of head tank 11a. A retractable feed pipe 34 was utilized for charging material into whichever head tank was in the operative position. All service lines (not shown) such as required for the steam coil, liquid level outlets, vibrator and motor were duplicated to insure a complete, immediately operable, stand-by unit. An inspection band 35 of the clamp type was provided about the lower portion of the head tank and the top of the tower as represented by 16. The band was adjusted to provide slidable engagement with the flange 23 and retainer ring 25 at the bottom of the head tank. The clearance between the bottom of the orifice plate 12 and the top of the tower as represented by 16 was approximately four inches, which afforded ready inspection in respect to orifice plate performance upon removal of the inspection band.

With reference to the head tank assembly heretofore described, it will be appreciated that there are several features which contribute to the improvement afforded by the invention. For example, since the molten material is subjected to vibratory impulses through the bellows-like resilient section, the flexing of this section imparts a lateral displacement to the molten material immediately above the dispersion orifices and reduces any tendency of "salting up" in this area. Furthermore, the revolving helical blades of the agitator constantly push forward a substantially continuous cylinder of material, although with some modification due to "slip" as is recognized for propeller type agitators. Still further, the control of maintaining a predetermined hydrostatic head also assists in the pass- or push-through characteristics of the assembly. Thus, three controllable factors are available which may be taken singly or in combination for modifying the pass-through characteristics of the material through the orifice plate. Generally, these factors are correlated for a particular material to obtain an optimum attenuation of the material leaving the bottom of the orifice plate, which in turn determines uniformity of the end-product granules while at the same time using the various force factors involved to insure long uninterrupted operation.

This may be more readily appreciated wherein the operation of a plant processing 75 tons per day of ammonium nitrate or limed ammonium nitrate, uninterrupted operation was increased 75 percent by utilizing the method and apparatus of this invention.

From the foregoing it is evident that there are numerous factors which will influence conditions for the most satisfactory operation of the invention, the actual limits of which cannot be established except by a detailed study of each set of raw materials and the intermediate and finished products involved. For example, the term "chemical substances" as used herein is meant to include a variety of materials more particularly related to fertilizers in which at least one solid constituent is convertible to the molten form without undue decomposition, such as ammonium nitrate, and to which at least one finely divided material, such as calcium carbonate material, may be added to form a molten suspension. Other solid nitrogen fertilizer materials include ammonium sulfate, monoammonium phosphate, ammonium phosphate-sulfate, sodium nitrate, calcium nitrate, and potassium nitrate. Other finely divided plant nutrients include the common materials utilized for manufacturing the great bulk of mixed fertilizers such as products of phosphorus, potash, calcium and/or magnesium, and including the trace elements such as manganese, boron, copper, zinc and cobalt. These various materials may be blended to give such primary nutrient analysis ($\%N-P_2O_5-K_2O$) as desired and although the products or mixtures to be granulated are of considerable variation in density, the correlation factors afforded by the present invention assures relatively uniform, efficient, and substantially uninterrupted granulation.

Generally, the molten material in the head tank will be maintained at a temperature of from about 340° to about 400° F. and the vertical vibratory impulses imparted thereto will range from about 10,000 to about 85,000 cycles per second. The hydrostatic head may be varied as desired by providing a plurality of liquid level outlets at from about 12 to about 24 inches from center to center. Moreover, although the agitator is not specifically critical as to pitch, it should be chosen of a diameter to adequately cover all orifice holes in the orifice plate and to minimize "slip" insofar as possible. The orifice plate, of course, contains apertures therethrough, which size may be from about .020 to about .050 inch depending on the size of end product desired. Moreover, the amount and particle size of suspended material in the molten material may be varied through a considerable range depending on the type of end product desired. Preferably, this amount may vary from about 0 to about 40% by weight with a particle size variation of from about 0.0120 to about 0.004 inch while still attaining the optimum advantages afforded by the invention. Preferred fertilizer compositions which may be prepared in accordance with the invention comprise ammonium nitrate and finely divided dolomitic limestone or limestone, or dolomite, or magnesite, in that order of preference. Nevertheless, the method and apparatus are equally efficacious for the preparation of a wide variety of more complete mixed fertilizers, for example:

| Proportion, Percent By Weight | Nutrient Analysis, Percent $N-P_2O_5-K_2O$ |
|---|---|
| 60:40—A.N.:Superphosphate | 21— 8— 0 |
| 60:40—A.N.:Triple superphosphate | 21—19— 0 |
| 60:20:20—A.N.:Triple superphosphate:KCl | 21—9.5—12 |
| 44:31:25—A.N.:Triple superphosphate:KCl | 15—15—15 |

(A.N.=ammonium nitrate.)

It will be appreciated that the granulated fertilizer products made in accordance with the invention may be coated with clay, diatomaceous earth and the like. Means such as coating and coating agents are not further described, however, since their application and choice are well within the province of persons skilled in the art.

It will be seen, therefore, that this invention actually may be carried out by the use of various modifications and changes without departing from its spirit and scope.

This application is a continuation-in-part of my application Serial No. 852,393, filed November 12, 1959.

What I claim and desire to protect by Letters Patent is:

1. In the method of granulating chemical substances from molten material thereof by passing the molten material through dispersion orifices form which it emerges in droplet form and is then passed into a solidification zone to form discrete solid granules, the improvement which comprises subjecting the molten material to vertical vibratory impulses with lateral displacement at the periphery thereof in the zone immediately above the dispersion orifices.

2. In the method of granulating chemical substances from molten material thereof by passing the molten material through dispersion orifices from which it emerges in droplet form and is then passed into a solidification zone to form discrete solid granules, the improvement which comprises subjecting the molten material to agitation and to vertical vibratory impulses with lateral displacement at the periphery thereof in the zone immediately above the dispersion orifices.

3. In the method of granulating chemical substances from molten material thereof by passing the molten material through dispersion orifices from which it emerges in droplet form and is then passed into a solidification zone to form discrete solid granules, the improvement which comprises subjecting the molten material to agitation accompanied by downward displacement and to vertical vibratory impulses with lateral displacement at the periphery thereof in the zone immediately above the dispersion orifices.

4. In the method of granulating chemical substances from molten material thereof by passing the molten material through dispersion orifices from which it emerges in droplet form and is then passed into a solidification zone to form discrete solid granules, the improvement which comprises maintaining a predetermined hydrostatic head of the molten material, and subjecting the molten material to vertical vibratory impulses with lateral displacement at the periphery thereof in the zone immediately above the dispersion orifices.

5. In the method of granulating chemical substances from molten material thereof by passing the molten material through dispersion orifices from which it emerges in droplet form and is then passed into a solidification zone to form discrete solid granules, the improvement which comprises maintaining a predetermined hydrostatic head of the molten material, and subjecting the molten material to agitation and to vertical vibratory impulses with lateral displacement at the periphery thereof in the zone immediately above the dispersion orifices.

6. In the method of granulating fertilizers from molten material thereof by passing the molten material through dispersion orifices from which it emerges in droplet form and is then passed into a solidification zone to form discrete solid granules, the improvement which comprises maintaining a predetermined hydrostatic head of the molten material, and subjecting the molten material to agitation accompanied by downward displacement and to vertical vibratory impulse with lateral displacement at the periphery thereof in the zone immediately above the dispersion orifices.

7. The method of claim 6 in which the molten material comprises ammonium nitrate.

8. The method of claim 6 in which the molten material comprises a suspension of at least one finely divided plant nutrient in ammonium nitrate.

9. Apparatus for the granulation of chemical substances from molten material thereof, which comprises a substantially vertical, elongated granulation tower, at least one molten material dispensing means positioned at the top of the tower for releasing drops of molten material into said tower, said dispensing means having in combination a head tank with the lower body portion thereof vertically resilient and the bottom thereof supporting an orifice plate associated with vertical impulse means, and a granular material outlet at the bottom of the tower.

10. Apparatus for the granulation of chemical substances from molten material thereof, which comprises a substantially vertical, elongated granulation tower, at least one molten material dispensing means positioned at the top of the tower for releasing drops of molten material into said tower, said dispensing means having in combination a head tank with the lower body portion thereof vertically resilient and the bottom thereof supporting an orifice plate associated with vertical impulse means, an agitator disposed within the lower body portion of the head tank, and a granular material otulet at the bottom of the tower.

11. Apparatus for the granulation of chemical substances from molten material thereof, which comprises a substantially vertical, elongated granulation tower, at least one molten material dispensing means positioned at the top of the tower for releasing drops of molten material into said tower, said dispensing means having in combination a head tank with the lower body portion thereof vertically resilient and the bottom thereof supporting an orifice plate associated with vertical impulse means, a downward thrust, helical blade agitator disposed within the lower body portion of the head tank, and a granular material outlet at the bottom of the tower.

12. Apparatus for the granulation of chemical substances from molten material thereof, which comprises a substantially vertical, elongated granulation tower, at least one molten material dispensing means positioned at the top of the tower for releasing drops of molten material into said tower, said dispensing means having in combination a head tank with the lower body portion thereof vertically resilient and the bottom thereof supporting an orifice plate associated with vertical impulse means, a downward thrust, helical blade agitator disposed within the lower body portion of the head tank, liquid level control means in the upper body portion of the head tank, and a granular material outlet at the bottom of the tower.

13. The apparatus of claim 9 for substantially continuous operation having a first dispensing means and a second dispensing means for alternate positioning thereof at the top of the tower for releasing the drops of molten material into the said tower.

14. The apparatus of claim 10 for substantially continuous operation having a first dispensing means and a second dispensing means for alternate positioning thereof at the top of the tower for releasing the drops of molten material into the said tower.

15. The apparatus of claim 11 for substantially continuous operation having a first dispensing means and a second dispensing means for alternate positioning thereof at the top of the tower for releasing the drops of molten material into the said tower.

16. The apparatus of claim 12 for substantially continuous operation having a first dispensing means and a second dispensing means for alternate positioning thereof at the top of the tower for releasing the drops of molten material into the said tower.

References Cited in the file of this patent

UNITED STATES PATENTS

| | | |
|---|---|---|
| 2,510,574 | Greenhalgh | June 6, 1950 |
| 2,528,407 | Yeandle | Oct. 31, 1950 |
| 2,661,497 | Birmingham | Dec. 8, 1953 |
| 2,714,224 | Schaub | Aug. 2, 1955 |
| 2,931,067 | Delaloyte et al. | Apr. 5, 1960 |